Nov. 18, 1958  V. S. MAGEE  2,860,568
ELECTRIC OVEN
Filed Aug. 10, 1956  3 Sheets-Sheet 1

Virgil S. Magee INVENTOR
BY
ATTORNEYS.

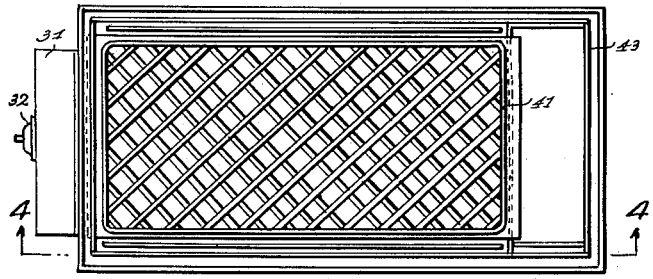
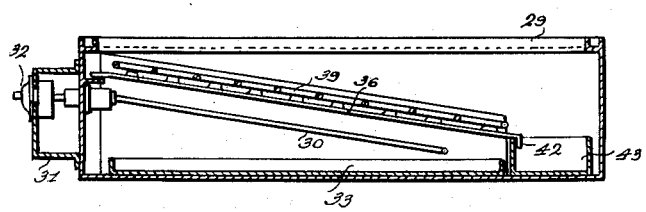
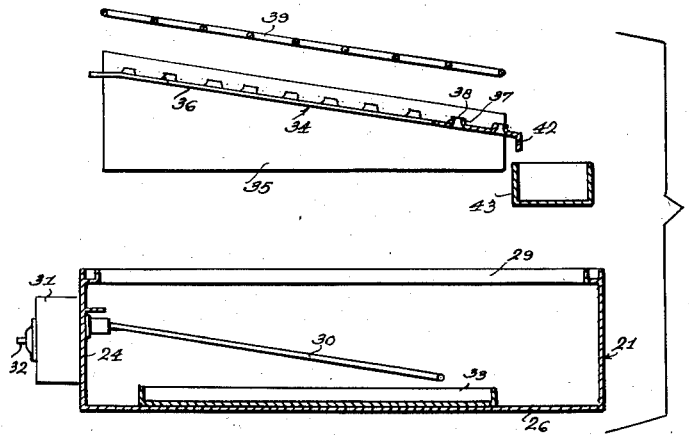
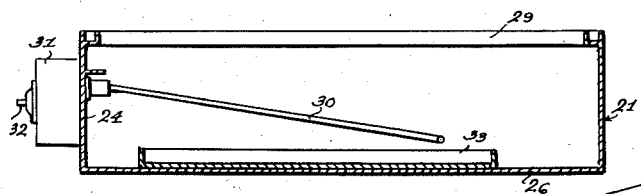
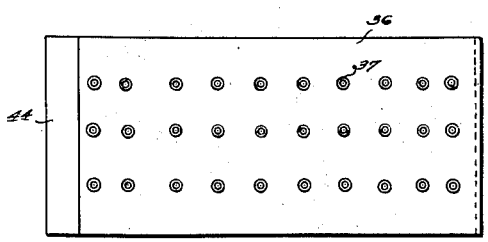

Nov. 18, 1958 V. S. MAGEE 2,860,568
ELECTRIC OVEN
Filed Aug. 10, 1956 3 Sheets-Sheet 3
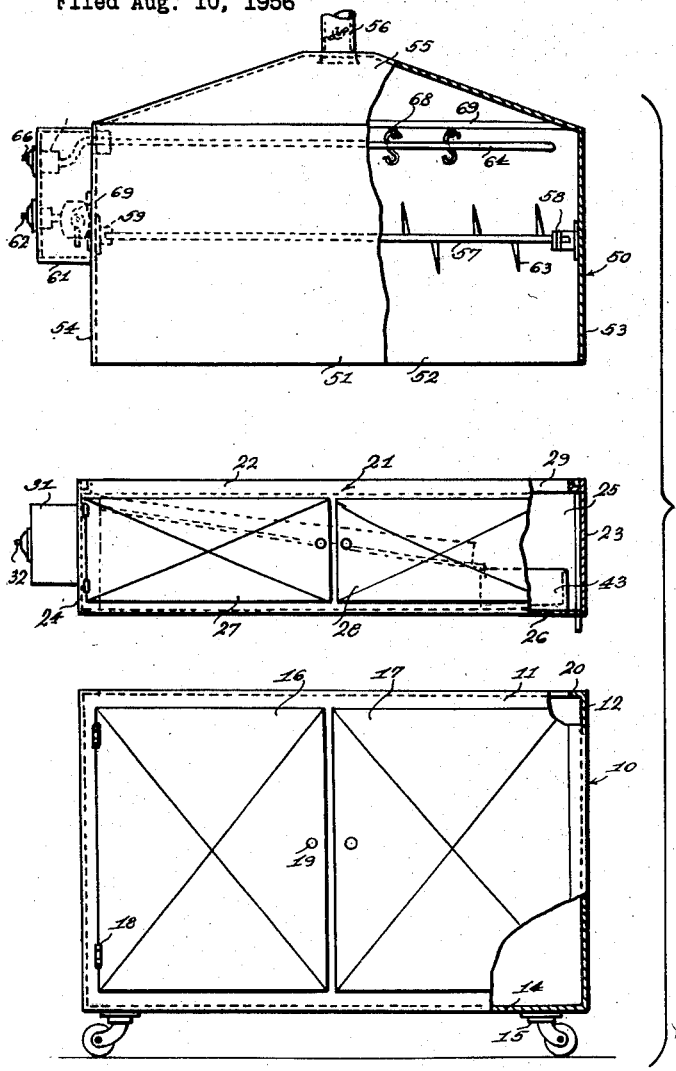
Fig. 9.
Virgil S. Magee INVENTOR
BY
ATTORNEYS.

United States Patent Office 2,860,568
Patented Nov. 18, 1958

2,860,568

ELECTRIC OVEN

Virgil S. Magee, Rockport, Tex., assignor of twenty-five percent to The James Darrell Spencer Trust Estate, and twenty-five percent to The Sandra Carol Spencer Trust Estate, both of which the trustee is Emory M. Spencer, all of Rockport, Tex.

Application August 10, 1956, Serial No. 603,342

1 Claim. (Cl. 99—339)

This invention relates to a portable electric oven or heating unit.

An object of this invention is to provide an electric oven or heating unit for broiling, roasting, smoking and barbecuing foods and fowl.

Another object of this invention is to provide a portable oven or cooking unit which also includes a storage cabinet in the lower portion thereof.

A further object of this invention is to provide a portable electric heating unit which includes an auxiliary heating element in the upper portion of the device.

A further object of this invention is to provide in a portable electric heating unit an improved draining means for draining the juices which drop from the food as the latter is being cooked.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Fig. 3 is a plan view of the intermediate heating unit.

Fig. 4 is a sectional view taken on line 4—4 of Fig. 3.

Fig. 5 is a vertical section in exploded view showing the elements used in the intermediate heating unit.

Fig. 6 is a plan view of one form of the drain pan or board.

Fig. 7 is a detail front elevation of one side of the drain unit structure.

Fig. 8 is an exploded view in front elevation partly broken away and in section showing the several elements forming the heating structure of this invention.

Fig. 9 is a fragmentary longitudinal section showing a modified form of a drain pan or board.

Figure 1:
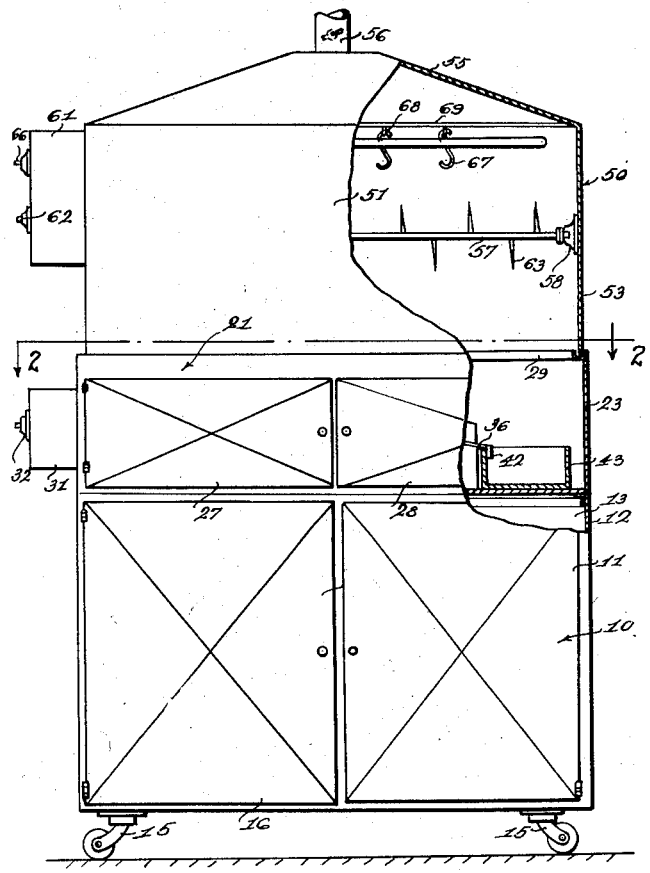
Fig. 1 is a detail front elevation partly broken away and in section of a portable electric heating device constructed according to an embodiment of this invention.
Figure 2:
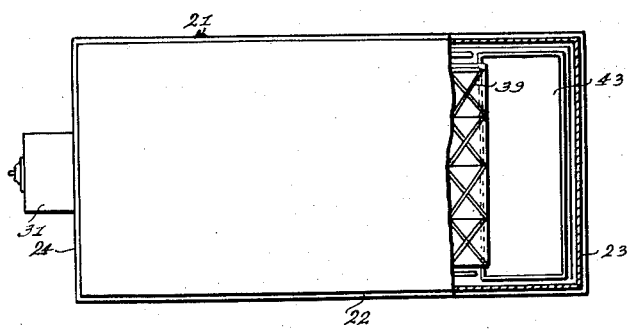
Fig. 2 is a sectional view taken on line 2—2 of Fig. 1.

Referring to the drawings the numeral 10 designates generally a cabinet or lower element which is formed of a front wall 11 opposite side walls 12 and a rear wall 13. The cabinet 10 also includes a bottom wall 14 and casters 15 are secured to the bottom wall 14. A pair of doors 16 and 17 are mounted on the front wall 11 being hinged as at 18 to the front wall 11 and knobs or handles 19 are secured to the inner edges of the doors 16 and 17. The upper edge of the cabinet 10 has an inwardly projecting flange 20 and the flange 20 provides a seat or support for an intermediate heating unit generally indicated at 21. The unit 21 is formed of a front wall 22 opposite end walls 23 and 24 and a rear wall 25. The intermediate unit 21 also includes a bottom wall 26. A pair of doors 27 and 28 are hingedly secured at their outer edges to the front wall 22. The intermediate heating element or unit 21 includes a U-shaped rim or upper edge 29, the purpose of which will be hereinafter described.

The intermediate heating element 21 includes an electric heating element 30 which extends downwardly and inwardly from the end wall 24. A regulating member 31 is disposed on the outer side of the wall 24 and a switch 32 is connected with the regulating unit 31 for selectively effecting the energizing of the heating unit or element 30. A pan or collector 33 is disposed on the bottom wall 26. A drain pan or element generally indicated at 34 is mounted on the bottom wall 26 and includes vertically disposed side members 35 between which a plate or drain member 36 is fixedly secured. As shown in Fig. 5 the drain element or plate 36 is provided with a plurality of upwardly offset dimples 37 which are open at their upper ends as indicated at 38. The openings through the upwardly offset elements 37 provides a means for the passage of the heat from the heating element 30. A grid 39 is adapted to be mounted on top of the drain member 34 and the grid 39 as shown in Fig. 3 is formed of a plurality of crossed bars 40 which are secured within a rectangular frame 41. The rear or lower end of the plate 36 is provided with a depending flange 42 which is adapted to project into a juice collecting pan 43 which is seated on the bottom wall 26 rearwardly of the collector 33. The opposite end of the plate 36 has a horizontally disposed flange or projection 44 which is adapted to seat on a ledge or flange 45 which projects inwardly from the end wall 24. At least one side wall 35 of the drain structure is formed with an opening 46 which may be closed by a sliding closure 47. The closure 47 is provided with a pair of elongated openings or slots 48 and a pair of headed closure guiding pins 49 are secured to and project from the side member 35.

An upper heating means or hood generally indicated at 50 is mounted on the intermediate heating member 21. The upper member or hood 50 is formed of front and rear walls 51 and 52 and opposite end walls 53 and 54. A substantially dome-shaped top wall 55 is secured to and extends upwardly from the walls 51, 52, 53, and 54 and a duct 56 extends from the peak or upper end of the top wall 55.

A rotary spit 57 is disposed in the hood or upper heating element 50 and one end of the spit 57 is rotatably disposed in a bearing 58 carried by the end wall 53. The other end of the spit 57 is engaged in a coupling member 59 which is rotated by means of a motor 60 which is mounted in a housing 61. The housing 61 extends from the wall 54 and a switch 62 regulates the operation of the motor 60. The spit member 57 has a plurality of pointed prongs 63 projecting therefrom in staggered relation so as to provide a means for supporting articles of food on the spit member 57.

An upper or auxiliary heating element 64 is disposed in the upper portion of the hood 50 and is connected to a control member 65 positioned within the housing 61. A switch 66 is connected with the control element or unit 65 whereby the heating element 64 may be selectively operated. The food may be hung within the hood 50 by means of hanger hooks 67 which are disposed in dependent relation within the upper portion of the hood 50 being secured to supporting hooks 68. The supporting hooks or members 68 are secured to a supporting bar 69 extending between the walls 53 and 54.

Where the device hereinbefore described is to be used as a broiler the articles of food are placed on the grid 39. Closing of switch 32 will energize heating element 30 and the heat from element 30 will radiate through the draining element 34 so as to provide sufficient heat to effect the broiling of the food.

Where the article of food is to be placed on the barbecue spit 57 the heating unit 30 may be energized and a heating unit 64 in the hood 50 may be energized by closing of switch 66. Closing of switch 62 will provide for rotation of the spit 57 so that the article of food will be thoroughly cooked or barbecued within the hood 50.

The cabinet 10 provides a means whereby the articles of food or other tools and utensils associated with the device may be kept in storage.

Due to the mounting of the entire structure on the caster wheels 15 the cooking and baking unit can be moved to any desired location where electric current is available.

In Fig. 9 there is disclosed a modified form of draining means which includes a corrugated plate generally indicated at 70. The plate 70 has upwardly directed corrugations 71 and at the peak of each corrugation 71 there are provided openings 72 for the passage of heat from the heating element 30. The valleys 73 formed at the bottom of the corrugation 71 provide a means whereby the juices will flow downwardly into the collector or pan 43. The corrugation 72 may either be disposed transversely of the heating member 21 or may be disposed longitudinally thereof. Where the corrugations 71 are disposed transversely of the heating member 21 the corrugated member 70 will be disposed on a slight angle to the vertical so that the juices will drain toward one longitudinal edge of the member 70 and at this edge a channel or other means may be provided for permitting the juices to flow downwardly into the collector 43.

What is claimed is:

A combined broiler and barbecue means comprising a lower supporting cabinet, casters carried by said cabinet, a broiler unit mounted on the upper end of said cabinet, said broiler unit comprising a housing open at the top and formed of opposite side and opposite end walls and a bottom wall, means comprising an inclined grid, supporting food articles above said bottom wall, an electric heating element in said housing below said supporting means, an inclined drain pan having a plurality of upwardly projecting perforated dimples providing draft openings between said grid and said heating element, a removable drain pan on said bottom wall below said heating element adjacent the lower end of said drain pan, a depending flange extending from the lower end of said drain pan into said drip pan, a removable second drip pan seated on said bottom wall beneath said drain pan, a hood rising from the top of said housing, a U-shaped hood support carried by the upper end of said housing, a spit rotatably carried interiorly of said hood, an electric motor for rotating said spit, a second electric heating element in said hood above said spit, and food suspension hooks carried by said hood directly beneath said second heating element.

References Cited in the file of this patent

UNITED STATES PATENTS

| | | |
|---|---|---|
| 2,253,834 | Volks | Aug. 26, 1941 |
| 2,330,132 | Martin et al. | Sept. 21, 1943 |
| 2,370,595 | Volks | Feb. 27, 1945 |
| 2,608,190 | Winning et al. | Aug. 26, 1952 |
| 2,621,586 | Roney | Dec. 16, 1952 |

FOREIGN PATENTS

| | | |
|---|---|---|
| 462,612 | Great Britain | Mar. 12, 1937 |